United States Patent
Thirunavukkarasu

(10) Patent No.: US 11,599,894 B2
(45) Date of Patent: Mar. 7, 2023

(54) METHOD AND SYSTEM FOR GENERATING CUSTOMER DECISION TREE THROUGH MACHINE LEARNING

(71) Applicant: Tata Consultancy Services Limited, Mumbai (IN)

(72) Inventor: Jeisobers Thirunavukkarasu, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 299 days.

(21) Appl. No.: 16/268,441

(22) Filed: Feb. 5, 2019

(65) Prior Publication Data

US 2020/0005340 A1    Jan. 2, 2020

(30) Foreign Application Priority Data

Jun. 29, 2018 (IN) .............................. 201821024236

(51) Int. Cl.
  *G06Q 30/02* (2012.01)
  *G06Q 10/08* (2012.01)
  (Continued)

(52) U.S. Cl.
  CPC ....... *G06Q 30/0202* (2013.01); *G06Q 10/087* (2013.01)

(58) Field of Classification Search
  CPC ... G06Q 30/02; G06Q 30/0202; G06Q 10/087
  (Continued)

(56) References Cited

U.S. PATENT DOCUMENTS 8,417,559 B2   4/2013 Joshi et al.
9,785,953 B2  10/2017 Desai et al.
(Continued)

OTHER PUBLICATIONS

Ferreira et al "Analytics for an Online Retailer: Demand Forecasting and Price Optimization" Manufacturing & Service Operations Management. Nov. 2015 https://www.researchgate.net/publication/283817399_Analytics_for_an_Online_Retailer_Demand_Forecasting_and_Price_Optimization. (Year: 2015).*

*Primary Examiner* — Eric W Stamber
*Assistant Examiner* — Alissa D Karmis
(74) *Attorney, Agent, or Firm* — Finnegan, Henderson, Farabow, Garrett & Dunner LLP

(57) ABSTRACT

A method and system for generating Customer Decision Tree (CDT) for an entity in accordance with an attribute value (AV) based demand transfer estimation for a product category using machine learning, is disclosed. The method includes aggregating very high volume of data associated with a plurality of AVs of a product category at a plurality of aggregation levels. Further, generating a data matrix, which represents data is a structured format for machine learning, at a predefined aggregation level for the product category and generating a prediction model with the data matrix to determine predicted AV sales for each AV at the predefined aggregation level. Further, optimizing the trained prediction model. Thereafter, generate the CDT utilizing the optimized prediction model, a Demand Transfer (DT) estimator, a scenario generator and a hierarchy generator. Machine learning based DT is more accurate, effectively generating more accurate CDT tree.

6 Claims, 11 Drawing Sheets

(51) Int. Cl.
*G06Q 30/0202* (2023.01)
*G06Q 10/087* (2023.01)

(58) Field of Classification Search
USPC .......................................................... 705/7.12
See application file for complete search history.

(56) References Cited

U.S. PATENT DOCUMENTS

| | | | | |
|---|---|---|---|---|
| 2010/0228604 A1* | 9/2010 | Desai | ................ | G06Q 30/0205 |
| | | | | 705/7.34 |
| 2013/0018700 A1* | 1/2013 | Ervolina | ................ | G06Q 10/06 |
| | | | | 705/7.31 |
| 2014/0200992 A1* | 7/2014 | Wang | ................ | G06Q 30/0246 |
| | | | | 705/14.45 |
| 2014/0324532 A1* | 10/2014 | Ghosh | ................ | G06Q 30/0202 |
| | | | | 705/7.31 |
| 2014/0358633 A1* | 12/2014 | Wu | ................ | G06Q 30/0202 |
| | | | | 705/7.31 |
| 2015/0127419 A1* | 5/2015 | Tiwari | ............. | G06F 16/24578 |
| | | | | 705/7.29 |
| 2017/0200172 A1* | 7/2017 | Wu | ................ | G06Q 30/0201 |
| 2019/0102670 A1* | 4/2019 | Ceulemans | ......... | G06N 3/0427 |

\* cited by examiner

| Entity IDE1) | (AG -4) | Sales drivers (SD1-SD5) for product category (P1-mobilephone) | | | | | | | | |
|---|---|---|---|---|---|---|---|---|---|---|
| Branch (B1-B3) | YY/MM /DD/HH. | store locati-on SD1 | trade popul-ation SD2 | Avg inco-me SD3 | Inventory availability(SD4) (available=1, unavailable =0) AT1-AT3 with each AT with 3 Attribute values AV1-AV3 | | | Inventory Stock (SD5) no. of units available(present) For AT1-AT3 for ATV1-ATV3 | | |
| | | | | | AT1 Colour | AT2 memory | AT3 brand | AT1 Colour | AT2 memory | AT3 brand |
| | | | | | C1,C2, C3 | M1,M2, M3 | Br1,Br2, Br3 | C1, C2 ,C3 | M1,M2, M3 | Br1,Br2, Br3 |
| E1-B1 | 2015/12 /1/1 | L1 | XX | 1111 | 1,1,1 | 1,1,1 | 1,1,1 | 20,22,24 | 10,12,14 | 9, 8, 8 |
| E1-B1 | 2015/12 /1/2 | " | " | " | 0,1,1 | 0,0,1 | 1,1,0 | 0, 21, 23 | | |
| E1-B1 | 2015/12 /1/3 | " | " | " | | | | | | |
| E1-B1 | 2015/12 /1/4 | " | " | " | | | | | | |
| E1-B1 | 2015/12 /1/5 | " | " | " | | | | | | |
| E1-B2 | 2015/12 /1/1 | L2 | YY | 2222 | | | | | | |
| E1-B2 | 2015/12 /1/2 | " | " | " | | | | | | |
| E1-B2 | 2015/12 /1/3 | " | " | " | | | | | | |
| E1-B2 | 2015/12 /1/4 | " | " | " | | | | | | |
| E1-B2 | 2015/12 /1/5 | " | " | " | | | | | | |
| E1-B3 | 2015/12 /1/1 | L3 | ZZ | 3333 | | | | | | |
| E1-B3 | 2015/12 /1/2 | " | " | " | | | | | | |
| E1-B3 | 2015/12 /1/3 | " | " | " | | | | | | |
| E1-B3 | 2015/12 /1/4 | " | " | " | | | | | | |
| E1-B3 | 2015/12 /1/5 | " | " | " | | | | | | |

FIG. 4a

| Entity (E1) | Aggre level (AG -4) | Recorded Product Sales (for inventory stock SD5) | | |
|---|---|---|---|---|
| Branch (B1-B3) | YY/MM /DD/HH. | For product category (P1) with 3 Attributes (AT1-AT3) and each Attribute with 3 Attribute values (ATV1-ATV3) units present | | |
| | | AT1 Colour | AT2 memory | AT3 brand |
| | | C1, C2, C3 | M1,M2,M3 | Br1,Br2,Br3 |
| E1-B1 | 2015/12/1/1 | 20,22,24 | 10,12,14 | 9, 8, 8 |
| E1-B1 | 2015/12/1/2 | 0, 21, 23 | | |
| E1-B1 | 2015/12/1/3 | | | |
| E1-B1 | 2015/12/1/4 | | | |
| E1-B1 | 2015/12/1/5 | | | |
| E1-B2 | 2015/12/1/1 | | | |
| E1-B2 | 2015/12/1/2 | | | |
| E1-B2 | 2015/12/1/3 | | | |
| E1-B2 | 2015/12/1/4 | | | |
| E1-B2 | 2015/12/1/5 | | | |
| E1-B3 | 2015/12/1/1 | | | |
| E1-B3 | 2015/12/1/2 | | | |
| E1-B3 | 2015/12/1/3 | | | |
| E1-B3 | 2015/12/1/4 | | | |
| E1-B3 | 2015/12/1/5 | | | |
| E1-B1 | 2015/12/1/1 | | | |

FIG. 4b

| Attribute Level → | | | | | Color | | | Memory | | | Brand | | | |
|---|---|---|---|---|---|---|---|---|---|---|---|---|---|---|
| store_id | month | day | total_population | median_hh_income | Black | White | Pink | GB2 | GB4 | GB16 | Ph1 | Ph2 | Ph3 | Comments |
| 1 | 1 | 1 | 175365 | 67459 | 1 | 1 | 1 | 1 | 1 | 1 | 1 | 1 | 1 | |
| 1 | 1 | 1 | 175365 | 67459 | 0 | 1 | 1 | 1 | 1 | 1 | 1 | 1 | 1 | Get the lowest DT Across attribute OUTPUT: lowest DT on attribute level. Attribute with the lowest DT is considered as an important product. |
| 1 | 1 | 1 | 175365 | 67459 | 1 | 0 | 1 | 1 | 1 | 1 | 1 | 1 | 1 | |
| 1 | 1 | 1 | 175365 | 67459 | 1 | 1 | 0 | 1 | 1 | 1 | 1 | 1 | 1 | |
| 1 | 1 | 1 | 175365 | 67459 | 1 | 1 | 1 | 0 | 1 | 1 | 1 | 1 | 1 | |
| 1 | 1 | 1 | 175365 | 67459 | 1 | 1 | 1 | 1 | 0 | 1 | 1 | 1 | 1 | |
| 1 | 1 | 1 | 175365 | 67459 | 1 | 1 | 1 | 1 | 1 | 0 | 1 | 1 | 1 | |
| 1 | 1 | 1 | 175365 | 67459 | 1 | 1 | 1 | 1 | 1 | 1 | 0 | 1 | 1 | |
| 1 | 1 | 1 | 175365 | 67459 | 1 | 1 | 1 | 1 | 1 | 1 | 1 | 0 | 1 | |
| 1 | 1 | 1 | 175365 | 67459 | 1 | 1 | 1 | 1 | 1 | 1 | 1 | 1 | 0 | |
| Assuming Color has the lowest DT. Below test data to find among the attribute Color(AV level) which has the lowest DT. Creating multiple rows of the different Color to get average DT | | | | | | | | | | | | | | |
| 1 | 1 | 1 | 175365 | 67459 | 1 | 1 | 1 | 1 | 1 | 1 | 1 | 1 | 1 | |
| 1 | 1 | 1 | 175365 | 67459 | 0 | 1 | 1 | 1 | 1 | 1 | 1 | 1 | 1 | OUTPUT: DT on Black AV |
| 1 | 1 | 1 | 175365 | 67459 | 1 | 0 | 1 | 1 | 1 | 1 | 1 | 1 | 1 | OUTPUT: DT on White AV |
| 1 | 1 | 1 | 175365 | 67459 | 1 | 1 | 0 | 1 | 1 | 1 | 1 | 1 | 1 | OUTPUT: DT on Pink AV |
| Assuming Black Color has the lowest DT. Below test data to find among the attribute Memory/Brand(AT level) which has the lowest DT. Creating multiple rows of the same Color to get average DT | | | | | | | | | | | | | | |

Example scenarios generated by scenario generator
with single AVs missing at given instant
FIG. 5a

| Attribute Level → | | | | | Color | | | Memory | | | Brand | | | Comments |
|---|---|---|---|---|---|---|---|---|---|---|---|---|---|---|
| store id | month | day | total_population | median_hh_income | Black | White | Pink | GB.2 | GB.4 | GB.16 | Ph1 | Ph2 | Ph3 | |
| 1 | 1 | 1 | 175365 | 67459 | 1 | 0 | 0 | 1 | 1 | 1 | 1 | 1 | 1 | |
| 1 | 1 | 1 | 175365 | 67459 | 1 | 0 | 0 | 0 | 1 | 1 | 1 | 1 | 1 | Get the lowest DT b/w Memory/Brand attribute OUTPUT: lowest DT on attribute level. |
| 1 | 1 | 1 | 175365 | 67459 | 1 | 0 | 0 | 1 | 0 | 1 | 1 | 1 | 1 | |
| 1 | 1 | 1 | 175365 | 67459 | 1 | 0 | 0 | 1 | 1 | 0 | 1 | 1 | 1 | |
| 1 | 1 | 1 | 175365 | 67459 | 1 | 0 | 0 | 1 | 1 | 1 | 0 | 1 | 1 | |
| 1 | 1 | 1 | 175365 | 67459 | 1 | 0 | 0 | 1 | 1 | 1 | 1 | 0 | 1 | |
| 1 | 1 | 1 | 175365 | 67459 | 1 | 0 | 0 | 1 | 1 | 1 | 1 | 1 | 0 | |
| Assuming Memory has the lowest DT. Below test data to find among the attribute Memory(AV level) which has the lowest DT. Creating multiple rows of the different Memory to get average DT | | | | | | | | | | | | | | |
| 1 | 1 | 1 | 175365 | 67459 | 1 | 0 | 0 | 1 | 1 | 1 | 1 | 1 | 1 | |
| 1 | 1 | 1 | 175365 | 67459 | 1 | 0 | 0 | 0 | 1 | 1 | 1 | 1 | 1 | OUTPUT: DT on GB.2 AV |
| 1 | 1 | 1 | 175365 | 67459 | 1 | 0 | 0 | 1 | 0 | 1 | 1 | 1 | 1 | OUTPUT: DT on GB.4 AV. |
| 1 | 1 | 1 | 175365 | 67459 | 1 | 0 | 0 | 1 | 1 | 0 | 1 | 1 | 1 | OUTPUT: DT on GB.16 AV. |
| Assuming GB.2 Memory has the lowest DT. Below test data to find among the attribute Brand(AV level) which has the lowest DT. Creating multiple rows of the different Brand to get average DT | | | | | | | | | | | | | | |
| 1 | 1 | 1 | 175365 | 67459 | 1 | 0 | 0 | 1 | 0 | 0 | 1 | 1 | 1 | |
| 1 | 1 | 1 | 175365 | 67459 | 1 | 0 | 0 | 1 | 0 | 0 | 0 | 1 | 1 | OUTPUT: DT on Ph2 AV |
| 1 | 1 | 1 | 175365 | 67459 | 1 | 0 | 0 | 1 | 0 | 0 | 1 | 0 | 1 | OUTPUT: DT on Ph1 AV |
| 1 | 1 | 1 | 175365 | 67459 | 1 | 0 | 0 | 1 | 0 | 0 | 1 | 1 | 0 | OUTPUT: DT on Ph3 AV |

Example scenarios generated by scenario generator
with single AVs missing at given instant
FIG. 5b

| Desired input | | | | | | | | | Predicted sales units by prediction model | | |
|---|---|---|---|---|---|---|---|---|---|---|---|
| Black | Pink | White | GB.16 | GB.2 | GB.4 | Ph3 | Ph2 | Ph1 | Pred_Black.1 | Pred_White.1 | Pred_Pink.1 |
| 1 | 1 | 1 | 1 | 1 | 1 | 1 | 1 | 1 | 11 | 274 | 317 |
| 0 | 1 | 1 | 1 | 1 | 1 | 1 | 1 | 1 | 0 | 274 | 319 |

FIG. 5c

| Black | Pink | White | GB.16 | GB.2 | GB.4 | Ph3 | Ph2 | Ph1 | Pred_Black.1 | Pred_White.1 | Pred_Pink.1 |
|---|---|---|---|---|---|---|---|---|---|---|---|
| 1 | 1 | 1 | 1 | 1 | 1 | 1 | 1 | 1 | 11 | 274 | 317 |
| 0 | 1 | 1 | 1 | 1 | 1 | 1 | 1 | 1 | 0 | 274 | 319 |
| Difference in predicted sales units | | | | | | | | | 11 | 0 | 2 |
| Demand Transfer from Black to other colors (AVs within AT-color) (%) | | | | | | | | | 0 | 0 | 18.18% |

FIG. 5d

| Color | | | DT | Memory | | | DT | Brand | | | DT |
|---|---|---|---|---|---|---|---|---|---|---|---|
| Black | White | Pink | | GB.2 | GB.4 | GB.16 | | Ph2 | Ph1 | Ph3 | |
| 1 | 1 | 1 | | 1 | 1 | 1 | | 1 | 1 | 1 | |
| 0 | 1 | 1 | DT from Color:Black | 1 | 1 | 1 | | 1 | 1 | 1 | |
| 1 | 0 | 1 | DT from Color:White | 1 | 1 | 1 | | 1 | 1 | 1 | |
| 1 | 1 | 0 | DT from Color:Pink | 1 | 1 | 1 | | 1 | 1 | 1 | |
| 1 | 1 | 1 | | 0 | 1 | 1 | DT from Memory:GB.2 | 1 | 1 | 1 | |
| 1 | 1 | 1 | | 1 | 0 | 1 | DT from Memory:GB.4 | 1 | 1 | 1 | |
| 1 | 1 | 1 | | 1 | 1 | 0 | DT from Memory:GB.16 | 1 | 1 | 1 | |
| 1 | 1 | 1 | | 1 | 1 | 1 | | 0 | 1 | 1 | DT from Brand Ph2 |
| 1 | 1 | 1 | | 1 | 1 | 1 | | 1 | 0 | 1 | DT from Brand:Ph1 |
| 1 | 1 | 1 | | 1 | 1 | 1 | | 1 | 1 | 0 | DT from Brand:Ph3 |
| | | | Avg DT color | | | | Avg DT mem | | | | Avg DT brand |

Identifying top node – AT by identifying
least avg DT among avg DTs of all AVs
FIG. 5e

| Color | | | Memory | | | DT | Brand | | | DT |
|---|---|---|---|---|---|---|---|---|---|---|
| Black | White | Pink | GB.2 | GB.4 | GB.16 | | Ph2 | Ph1 | Ph3 | |
| 1 | 0 | 0 | 1 | 1 | 1 | | | | | |
| 1 | 0 | 0 | 0 | 1 | 1 | DT from Memory:GB.2 | 1 | 1 | 1 | |
| 1 | 0 | 0 | 1 | 0 | 1 | DT from Memory:GB.4 | 1 | 1 | 1 | |
| 1 | 0 | 0 | 1 | 1 | 0 | DT from Memory:GB.16 | 1 | 1 | 1 | |
| 1 | 0 | 0 | 1 | 1 | 1 | | 0 | 1 | 1 | DT from Brand: Ph2 |
| 1 | 0 | 0 | 1 | 1 | 1 | | 1 | 0 | 1 | DT from Brand: Ph1 |
| 1 | 0 | 0 | 1 | 1 | 1 | | 1 | 1 | 0 | DT from Brand: Ph3 |
| | | | | | | Avg DT mem | | | | Avg DT brand |

Identifying subnode AT for AV-black with pink and white unavailable based on least avg DT among AT-mem and AT-brand

METHOD AND SYSTEM FOR GENERATING CUSTOMER DECISION TREE THROUGH MACHINE LEARNING

CROSS-REFERENCE TO RELATED APPLICATIONS AND PRIORITY

This application takes priority from the Indian filed application no. 201821024236 filed on 29 Jun. 2018 the entirety of which is hereby incorporated by reference.

DESCRIPTION

Technical Field

The disclosure herein generally relates to field of consumer market analytics and, more particularly to, the consumer market analytics for generating Customer Decision Tree (CDT).

Background

Market analysis is critical to understand trends, demands, behavioral and buying patterns of customers. In a retail market scenario, the market analysis enables an entity to analyze, understand and then predict customer decision making process for selecting and buying a product. Typical scenarios, a product of interest a customer is looking for is unavailable, it is critical for a retailer to know how the customer's demand from one product gets transferred to other similar product. Understanding the customer decision process enables the entity to ensure inventory stock of a right product.

The customer decision process is part of cost-benefit analysis, in the presence of multiple alternatives available to a customer. In general, consumer buying decisions can be analyzed based on multiple models such as an economic model, a psychological model and a consumer behavior model. The economic model is largely quantitative and is based on the assumptions of rationality and near perfect knowledge. The psychological model analyzes the customer decision from psychological and cognitive processes perspective such as motivation and need of the consumer. Psychological models are qualitative rather than quantitative and build on sociological factors like cultural influences and family influences. The consumer behavior model is a practical model used by marketers. The consumer behavior model takes into consideration the economic and the psychological models. A Customer Decision Tree (CDT) approach provides one way of modelling consumer behavior providing graphical representation of a decision hierarchy of customers in a product attribute space for the purchase of an item or product in a given category product category. CDT is modelled on how the customers or consumers consider different alternatives (based on attributes) within a category before narrowing down to the item of their choice. The CDT, also referred as product segmentation and category structure helps to understand the purchasing decision of the customer. Conventionally brand manufacturers or third party market research firms generate CDTs based on surveys and other tools of market research. However, for a retailer, where the CDTs play a critical role, the CDTs from these sources may not provide accurate data as the CDTs are generalized and are not specific to the entity or the retailer. Thus, such conventional approaches have limitations providing less accurate CDTs as they do not necessarily capture factual data for the retailer who is interested in understanding the customer decision process at his/her retail end.

In retail scenario it is critical to understand and determine the attributes important to the customers and how their preferences might influence the purchase decision if the customer does not find their first choice. Most of the time customers do not buy products, they buy a bundle of attributes. Also, customer preference varies based on each attribute separately and also in combination of other attributes which are influenced by promotion, competition, demographics and other sales features. By focusing on the attributes of products, retailers can maximize their number of customers by understanding their mindset. Thus, whenever one or more products is unavailable or need to be removed due to constraint in space, the demand of the products will shift to the products to be kept in the store. More precisely the demand of an attribute value will shift to another attribute. If we could estimate the attribute level demand transfer it could be used to understand the customer mindset.

Understanding customer mindset has a significant impact on sales and gross margin, and therefore predicting customer decision is seen as of high importance to many retailers. Some attempts have been made to provide commercial tools relating to customer decision tree prediction. Existing methods for generating CDT deal with the effect of transference across products and not about attribute transference. Some existing methods provide CDTs to the retailer specific to his/her end, however the approach is conventional using statistical analysis. Further, scalability, computational efficiency of the input data being analyzed is limited as the existing methods utilizes statistical analysis with deriving correlations between attribute value pairs. Also sales drivers that are considered are limited and do not provide option to include all possible the sales drivers such as demographics, competition and the like that have equal impact on customer's decision. Moreover, the existing CDTs are based on historical data and do not consider non-occurred scenarios. Also, they do not cover the major sales drivers such as promotion, competition, demographics and others. Hence, accuracy of the generated CDT using the existing method is limited to findings from the historical data.

SUMMARY

Embodiments of the present disclosure present technological improvements as solutions to one or more of the above-mentioned technical problems recognized by the inventors in conventional systems. For example, in one embodiment, a method for generating a Customer Decision Tree (CDT) for an entity in accordance with an attribute value (AV) based Demand Transfer (DT) estimation for a product category. The method comprises aggregating data associated with a plurality of attribute values (AVs) of the product category managed by the entity, wherein aggregation of the data is at a plurality of aggregation levels and the product category is identified with a plurality of attributes (ATs) with each attribute (AT) having the plurality of attribute values (AVs). The method further comprises generating a data matrix providing a multivariate multi-dependent structure from the data aggregated at a predefined aggregation level for the product category for the plurality of attribute values (AVs). A plurality of columns of the data matrix correspond to entity identity (ID) of the entity, the pre-defined aggregation level, sales drivers and recorded attribute value (AV) sales, wherein the sales drivers comprise demographic data associated with the product category, inventory availability of the attribute value (AV) and inventory stock of the attribute value (AV). A plurality of rows of the data matrix correspond to the data aggregated for a plurality of branches of the entity for the predefined aggregation level. The method further comprises generating a prediction model, using the data matrix with the multivariate multi-dependent structure, to determine predicted attribute value (AV) sales for each attribute value (AV) of the product category at the predefined aggregation level, wherein the prediction model is a multivariate multi-structure machine learning model. The method further comprises optimizing the prediction model to reduce error between the predicted attribute value (AV) sales and the recorded attribute value (AV) sales to minimum. The optimization comprises generating the data matrix for each aggregation level among the plurality of aggregation levels. Further, determining predicted attribute value (AV) sales at each aggregation level using the prediction model. Further, determining error between the recorded attribute value (AV) sales and the predicted attribute value (AV) sales at each aggregation level. Further, identifying an optimum aggregation level from the plurality of aggregation levels based on the determined error, wherein the determined error for the identified aggregation level is minimum. Furthermore fine tuning the prediction model using the data matrix associated with the optimal aggregation level. The method furthermore comprises generating the CDT utilizing the optimized prediction model.

In yet another embodiment, is provided a system for generating a Customer Decision Tree (CDT) for an entity in accordance with an attribute value (AV) based demand transfer for a product category. The system comprises a data lake, as data source for aggregating data at a plurality of aggregation levels, a CDT system (102) connected with the data lake. The CDT system comprising a data matrix generator 212, a model generator 214, a prediction model 216, a DT Estimator 218, a scenario generator 220, a hierarchy generator 222 and a CDT generator 224. The data matrix generator 212 is configured to aggregate data associated with a plurality of attribute values (AVs) of the product category managed by the entity, wherein aggregation of the data is at a plurality of aggregation levels and the product category is identified with a plurality of attributes (ATs) with each attribute (AT) having the plurality of attribute values (AVs). Further, the data matrix generator is configured to generate a data matrix providing a multivariate multi-dependent structure from data aggregated at a predefined aggregation level for the product category for the plurality of attribute values (AVs). A plurality of columns of the data matrix correspond to entity identity (ID) of the entity, the pre-defined aggregation level, sales drivers and recorded attribute value (AV) sales, wherein the sales drivers comprise demographic data associated with the product category, inventory availability of the attribute value (AV) and inventory stock of the attribute value (AV). A plurality of rows of the data matrix correspond to the data aggregated for a plurality of branches of the entity for the predefined aggregation level. Further, the model generator is configured to generate the prediction model, using the data matrix with the multivariate multi-dependent structure, to determine predicted attribute value (AV) sales for each attribute value (AV) of the product category at the predefined aggregation level, wherein the prediction model is a multivariate multi-structure machine learning model. Further, the model generator is configured to optimize the prediction model to reduce error between the predicted attribute value (AV) sales and the recorded attribute value (AV) sales to minimum. The optimization comprises generate the data matrix for each aggregation level among the plurality of aggregation levels. Further, determine predicted attribute value (AV) sales at each aggregation level using the trained prediction model. Further, determine error between the recorded attribute value (AV) sales and the predicted attribute value (AV) sales at each aggregation level. Further, identify an optimum aggregation level from the plurality of aggregation levels based on the determined error, wherein the determined error for the identified aggregation level is minimum. Further, fine tune the trained prediction model to obtain the optimized prediction model using the data matrix associated with the optimal aggregation level. Furthermore, the CDT generator 224 is configured to generate the CDT utilizing the optimized prediction model.

In yet another aspect, one or more non-transitory machine readable information storage mediums comprising one or more instructions which when executed by one or more hardware processors cause generating a Customer Decision Tree (CDT) for an entity in accordance with an attribute value (AV) based Demand Transfer (DT) estimation for a product category. The actions comprise aggregating data associated with a plurality of attribute values (AVs) of the product category managed by the entity, wherein aggregation of the data is at a plurality of aggregation levels and the product category is identified with a plurality of attributes (ATs) with each attribute (AT) having the plurality of attribute values (AVs). The actions further comprise generating a data matrix providing a multivariate multi-dependent structure from the data aggregated at a predefined aggregation level for the product category for the plurality of attribute values (AVs). A plurality of columns of the data matrix corresponding to entity identity (ID) of the entity, the pre-defined aggregation level, sales drivers and recorded attribute value (AV) sales, wherein the sales drivers comprise demographic data associated with the product category, inventory availability of the attribute value (AV) and inventory stock of the attribute value (AV). A plurality of rows of the data matrix correspond to the data aggregated for a plurality of branches of the entity for the predefined aggregation level. The actions further comprise generating a prediction model, using the data matrix with the multivariate multi-dependent structure, to determine predicted attribute value (AV) sales for each attribute value (AV) of the product category at the predefined aggregation level, wherein the prediction model is a multivariate multi-structure machine learning model. The actions further comprise optimizing the prediction model to reduce error between the predicted attribute value (AV) sales and the recorded attribute value (AV) sales to minimum. The optimization comprises generating the data matrix for each aggregation level among the plurality of aggregation levels. Further, determining predicted attribute value (AV) sales at each aggregation level using the prediction model. Further, determining error between the recorded attribute value (AV) sales and the predicted attribute value (AV) sales at each aggregation level. Further, identifying an optimum aggregation level from the plurality of aggregation levels based on the determined error, wherein the determined error for the identified aggregation level is minimum. Furthermore fine tuning the prediction model using the data matrix associated with the optimal aggregation level. The actions furthermore comprise generating the CDT utilizing the optimized prediction model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4a and 4b illustrates an example data matrix representing data aggregated from a data lake as a multivariate multi-dependent structure for generating a prediction model using machine learning, in accordance with some embodiments of the present disclosure.

FIG. 5a through 5h explains the method for CDT generation with a use case example, in accordance with some embodiments of the present disclosure.

DETAILED DESCRIPTION OF EMBODIMENTS

Figure 1:
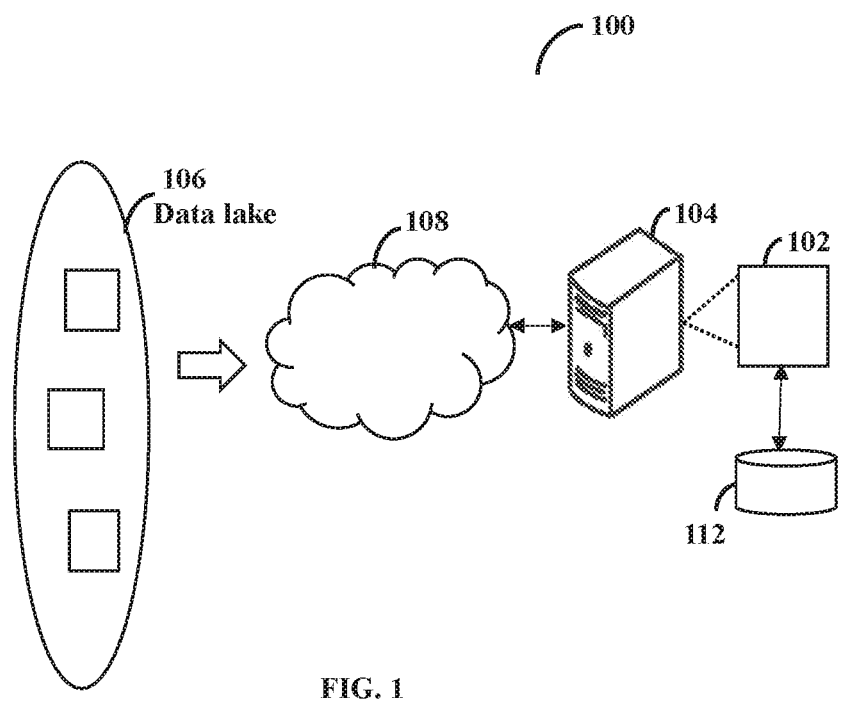
FIG. 1 illustrates an example system implementing a machine learning based Customer Decision Tree (CDT) system, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A method and system for generating Customer Decision Tree (CDT) for an entity in accordance with an attribute value (AV) based demand transfer estimation for a product category using machine learning, is disclosed.

The product category herein refers to a group of products, wherein the group of products have a plurality of attributes (interchangeably referred as ATs) with each AT having a plurality of attribute values (interchangeably referred as AVs). Thus for a product category of interest managed by an entity, customers can find alternative attribute values (AVs) within an attribute (AT).

The CDT is a graphical representation of customer's decision making process in the form of a tree having a top node and a plurality of sub nodes. The top node represents most important attribute (AT) preferred by the customers while sub nodes represent next important attribute (AT) or attribute value (AV) for the customers. This CDT generation finds application in multiple domains where the decision is made based on multiple common criteria (ATs) and each criteria has multiple choice sets (AVs).

For example, in retail sector, group of mobiles may form the product category managed by a megastore (entity) having multiple branches spread over a larger area. Herein, brand, color, memory size options available are examples of attributes (ATs) of the product category (mobile). Each AT, can further have multiple attribute values (AVs). For example, for brand the AVs can be Samsung, Nokia, and iPhone. Similarly for color the AVs may be black, while, red and so on. The CDT generated for the mobiles projects customers choices as a hierarchical tree structure to an end user (owner of the entity). This enables the owner to stock inventory accordingly.

In another example, in an insurance sector, the product category may refer to different insurance policy options made available to customers by an insurance company. The CDT projects customer's choice flow as hierarchical structure. Similar is scenario in banking sector, wherein the CDT is generated for loan options provided by banks.

The generation of the CDT based on the machine learning approach includes aggregating data from a data at plurality of aggregation levels. A data matrix is generated for data aggregated for each aggregation level. The data matrix, so generated represents the aggregated data as a multivariate multi-structure format. Further, using the data matrix at a predefined aggregation level, the method includes generating a prediction model for predicting attribute value (AV) sales for the product category. The term AV sales herein refers to number of units sold, alternatively referred as sales units, for the product category corresponding to each attribute value (AV) among the plurality of AVs of the product category. The data matrix, which represents the aggregated data as the multivariate multi-dependent structure, is provided as input data for machine learning processes, to generate the prediction model. The prediction model is further optimized or refined. The optimization process includes identifying an optimum aggregation level from the plurality of aggregation levels at which the data is aggregated. The optimum aggregation level is a data aggregation level for which the predicted attribute value (AV) sales of all the AVs for the product category, as predicted by the prediction model, provides minimum variation from actual recorded sales (recorded sales units). This completes the prediction model refinement or development, and the optimized model is further used for prediction of AV sales. The predicted AV sales are then used for estimating DT between the various AVs of the product category. The advantages of the optimization approach of the method disclosed are explained herein with an example. In an online shopping scenario, rate of online sales (units sold) is high as multiple customers shop for a product category, wherein shopping continues throughout the day. Such scenarios may require data aggregation per minute to accurately capture sales pattern of the product category, herein specifically at attribute value (AV) level. However, if the data is aggregated per day, this I may not capture the sales movement accurately, effectively missing relevant data during generation of the prediction model, in turn reducing accuracy of the predicted AV sales. However, in yet another example for a retail store, sales movement is slow and data aggregation per day may be sufficient to capture the relevant data. The data aggregation if performed at hourly or minute level may not indicate significant change in sales movement. Thus optimum level selected at per day reduces computation for generating the optimized prediction model still maintain required accuracy of AV sales prediction to generate more accurate CDT.

Once the prediction model is optimized, thereafter, method includes generating the CDT utilizing the optimized prediction model, a Demand Transfer (DT) estimator, a scenario generator and a hierarchy generator. The machine learning approach used by the method enables handling very high volume of aggregated data to generate the prediction model for predicting AV sales, providing scalable approach.

Once the CDT is generated, for the entity, the end user (for example, entity owner), can identify the customer behaviors and stock inventory accordingly. Further, as required, the prediction model can be refined and CDT tree can be generated accordingly as frequently as the demand may be, typically for scenarios with sales patterns changing at faster pace.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an example system 100 implementing a machine learning based CDT system 102, according to some embodiments of the present disclosure.

The system 100 depicts a data lake 106. As understood in the art, the data lake 106 is a storage repository that holds a vast amount of raw data in its native format, including structured, semi-structured, and unstructured data. The data structure and requirements are not defined until the data is required data by the CDT system 102. In an embodiment, the data lake 106 may be directly connected to the CDT system 102, which is implemented in a computing device 104. As depicted, the CDT system 102 may be externally coupled (as shown in FIG. 1) to the computing device 104 or may be internal (not shown) to the computing device 104. A data repository 112 may be externally coupled to the CDT system 102. In an alternate embodiment, the data repository 112 may be internal to the CDT system 102 (depicted in FIG. 2).

To generate the CDT for the product category of interest, the CDT system 102 can be configured to aggregate very high volume of data associated with a plurality of attribute values (AV) of the product category at the plurality of aggregation levels from the data lake 106. The plurality of aggregation levels, for example include, aggregation of data per second, per minute, per hour, per day, per week, per month and so on for the product category under consideration. Once data is aggregated at the plurality of aggregation levels, for a predefined aggregation level the data is represented in form the data matrix, which represents data in a format for machine learning, such as the multivariate multi-dependent structure. For example, sales units of attribute values (alternatively referred as AV sales) are represented in the matrix format and act as multivariate dependent structure for machine learning to generate the prediction model. This structure captures the interaction effect that happens within dependent variables themselves. Similarly, major sales drivers that includes inventory details of attribute values (AVs) providing inventory availability and inventory stock, are represented by the matrix format and act as multivariate independent structure for machine learning. Both dependent and independent matrix structure enable to capture interaction effect that exist in business scenarios.

At first, the predefined aggregation level can be approximated, for example, based on the rate of sales movement of an inventory stock for an entity. Further, for the predefined aggregation level for the product category, the CDT system 102 can be configured to generate the prediction model using the data matrix with data aggregated at the pre-defined level. The prediction model provides predicted AV sales for each AV of the product category at the predefined aggregation level. Known machine learning techniques such as Random forest Survival, Regression and Classification (SRC) are used to generate the prediction model. The prediction model is generated using data aggregated at the plurality of levels as input data. The prediction model is a multivariate multi-structure based machine learning model. Further, the CDT system 102 can be configured to optimize the prediction model. Once the prediction model is optimized, the CDT system 102 is configured to generate the CDT for the product category utilizing the optimized prediction model, the DT estimator, the scenario generator and the hierarchy generator.

In an embodiment, a network 108, transmitting data streams from the data lake 106 to the computing device 104, may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the CDT system 102 through communication links. In an embodiment, the computing device 104, which implements the CDT system 102 can be a workstation, a mainframe computer, a general purpose server, a network server or the like. Further, the repository 112, coupled to the CDT system 102 may also store other data such as the intermediate data generated during CDT generation.

Figure 2:
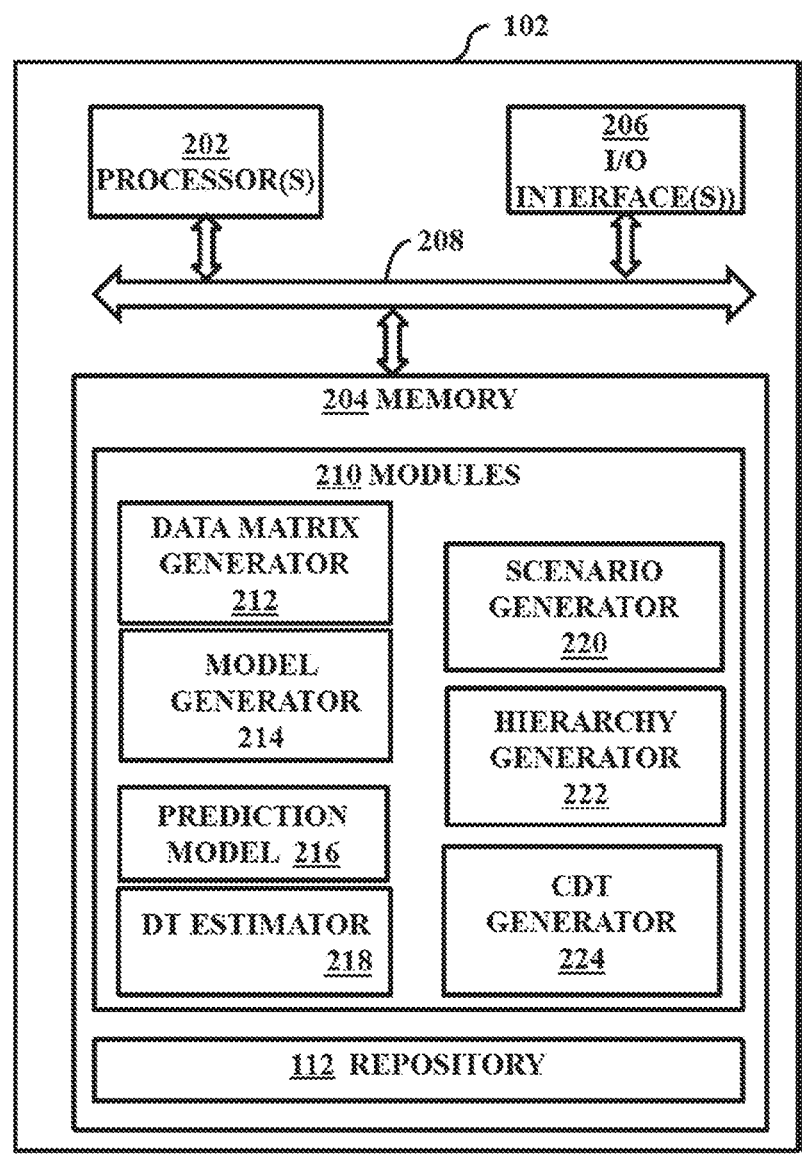
FIG. 2 illustrates a functional block diagram of the CDT system of FIG. 1, according to some embodiments of the present disclosure.

The components or modules and functionalities of system 102 for CDT generation are described further in detail in conjunction with FIG. 2.

FIG. 2 illustrates a functional block diagram of the CDT system 102 of FIG. 1, according to some embodiments of the present disclosure.

The CDT system 102 includes or is otherwise in communication with one or more hardware processors such as a processor(s) 202, at least one memory such as a memory 204, and an I/O interface 206. The processor 202 (hardware processor), the memory 204, and the I/O interface(s) 206 may be coupled by a system bus such as a system bus 208 or a similar mechanism. The memory 204 further may include modules 210.

In an embodiment, the modules 210 include a data matrix generator 212, a model generator 214, a prediction model 216, a Demand Transfer (DT) estimator 218, a scenario generator 220, a hierarchy generator 222 and a CDT generator 224 for implementing functions of the CDT system 102. In an embodiment, the modules 210 can be an Integrated Circuit (IC), external to the memory 204 (not shown), implemented using a Field-Programmable Gate Array (FPGA) or an Application-Specific Integrated Circuit (ASIC). The names of the modules of functional block within the modules 210 referred herein, are used for explanation and are not a limitation.

Figure 3:
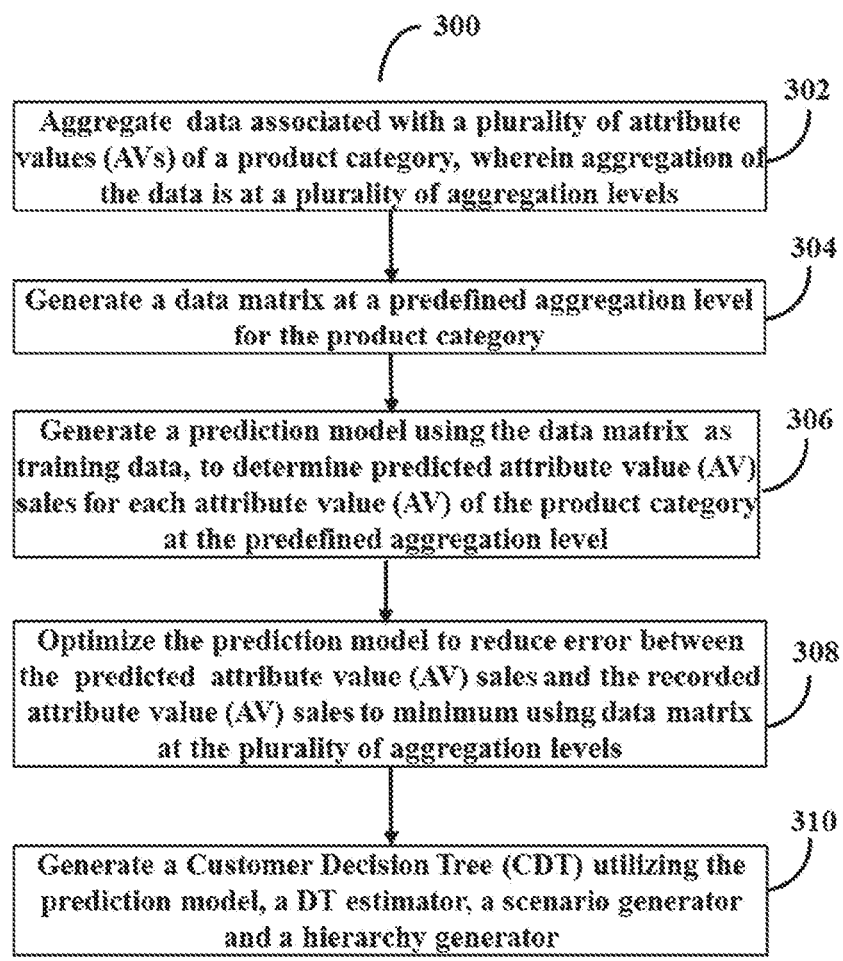
FIG. 3 is a flow diagram illustrating machine learning based approach providing a method for generating the CDT for an entity based on attribute value (AV) based demand transfer (DT) for a product category, in accordance with some embodiments of the present disclosure.

The functions of modules (212 through 224) to generate Customer Decision Tree (CDT) for the entity in accordance with the attribute value (AV) based demand transfer estimation for the product category of interest using machine learning is described in conjunction with FIG. 3, FIG. 4 and FIG. 5

The hardware processor(s) 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the modules 210, internal or external to the memory 204, for triggering execution of functions to be implemented by the modules 210.

The I/O interface(s) 206 in the CDT system 102 may include a variety of software and hardware interfaces, for example, a web interface, a graphical user interface and the like enabling communication with the computing device 104, data lake 106 and the repository 112 (if coupled externally). The interface(s) 206 may include a variety of software and hardware interfaces, for example, interfaces for peripheral device(s), such as a keyboard, a mouse, an external memory, a printer and a display. The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting a number of computing systems with one another or to another server computer. The I/O interface(s) 206 may include one or more ports for connecting a number of devices to one another or to another server. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 may include computer-readable instructions that supplement applications or functions performed by the CDT system 102. The repository 112 may store data that is processed, received, or generated as a result of the execution of one or more modules in the module(s) 210.

FIG. 3 is a flow diagram illustrating machine learning based approach providing a method 300 for generating the CDT for an entity from attribute value (AV) level demand transfer (DT) estimation for a product category through machine learning, in accordance with some embodiments of the present disclosure.

In an embodiment, at step 302, the method 300 includes allowing the data matrix generator 212 to aggregate data associated with the plurality of attribute values (AVs) of the product category from the data lake 106. The data lake 106 is a data source that can provide data associated with the product category for all branches of the entity is aggregated. The product category may be managed by the plurality of branches of the entity. The data aggregation is done at a plurality of aggregation levels.

Once data is aggregated, at step 304, the method 300 includes allows the data matrix generator 212 to generate the data matrix at the predefined aggregation level for the product category from the data aggregated for the plurality of attribute values (AVs) for the product category. The data matrix comprises a plurality of columns and a plurality of rows. The plurality of columns of the data matrix correspond to entity identity (ID) of the entity, the pre-defined aggregation level, sales drivers and recorded attribute value (AV) sales. The sales drivers comprise demographic data associated with product category, inventory availability of the attribute value (AV) and inventory stock of the attribute value (AV). The product category is identified with the plurality of attributes (ATs) with each attribute (AT) having the plurality of attribute values (AVs). The plurality of rows of the data matrix correspond to the data aggregated for the plurality of branches for the predefined aggregation level. The data matric is further explained in conjunction with FIG. 4 The aggregated data, represented as the data matrix in the multivariate multi-dependent structure can dynamically accommodate all possible sales drivers that may affect the sales of the product category under consideration. This enables processing large volume of data corresponding to all possible sales drivers and recorded attribute value (AV) sales for the product category under consideration. The sales drivers comprise demographic data associated with the product category, inventory availability of the attribute value (AV) and inventory stock of the attribute value (AV). Existing methods are unable to accommodate all possible sales drivers simultaneously, as well as are unable to capture interactions present between attribute values (AV). All n number of sales drives, at the plurality of aggregation levels can be considered while generating the prediction model, effectively providing the prediction model 216 that can predict highly accurate AV sales, effectively more accurate CDT. The sales drivers can be dynamically added as required by incrementing the columns of the data matrix as required and the prediction model may be refined with the additional sales drivers. Thus, consideration of all sales driver enables to understand and predict the complex demand transfer, for example, in a retail scenario, where demand transfer happens across different combination of attributes which are influenced by customer lifestyle, demographics, seasonality and sales promotion. Further, sales drivers for all branches of the entity across a city, state, country and so on are. Thus, machine learning based prediction of AV sales to compute DT provides higher DT accuracy, effectively predicting more accurate CDT for the product category. It can be understood that the machine learning approach enhances scalability by enabling handling of huge volume of data corresponding to the sales drivers, wherein increased number of sales drivers considered improve accuracy of CDT as sales drivers are parameters, which have direct impact on AV sales.

At step 306, the method 300 includes allowing the model generator 214 to generate the prediction model 216, using the data matrix. The prediction model 216 is configured to determine predicted attribute value (AV) sales for each attribute value (AV) of the product category at the predefined aggregation level. The prediction model is the multivariate multi-structure machine learning model. At step 308, the method includes allowing the model generator 214 to optimize the prediction model 216 to reduce error between the predicted attribute value (AV) sales and the recorded attribute value (AV) sales to minimum. This is achieved by using the data matrix at the plurality of aggregation levels and identifying the appropriate optimum aggregation level.

The optimization step 308 of method 300 is performed by the model generator 214. During optimization the data matrix generator 212 generates the data matrix for each aggregation level. Further, the model generator 214 determines predicted attribute value (AV) sales at each aggregation level using the prediction model 216. Further, the model generator 214 determines error between the recorded attribute value (AV) sales and the predicted attribute value (AV) sales at each aggregation level. Further, the model generator 214 identifies the optimum aggregation level from the plurality of aggregation levels based on the determined error, wherein error associated with the optimum aggregation level is minimum in comparison with other data aggregation levels. Further, the model generator 214 fine tunes the prediction model to obtain the prediction model 216, which is now the optimized prediction model that is based on the data matrix associated with the optimal aggregation level.

Upon generating the prediction model 216 and optimizing it, at step 310, the method 300 includes allowing the CDT generator to generate the CDT utilizing the optimized prediction model 216. In an embodiment, at step 310, the method 300, enables CDT generation by performing the following steps. The method 300 allows the scenario generator 220 to generate a plurality of scenarios comprising an all-available scenario and not-all available scenarios corresponding to inventory availability of the attribute value (AV). Further, the method 300 allows the prediction model 216 to determine the predicted attribute value (AV) sales for the plurality scenarios. The all-available scenario correspond to the inventory stock of the product category with all ATs and all AVs for each AT available for sales. The not-all-available scenarios correspond to inventory stock with one or more missing attributes among the plurality of attributes (ATs) and one or more missing attributes values (AVs) among the plurality of attribute values (AVs) of the product category.

Further, the method 300 allows the DT estimator 218 to estimate a plurality of Demand Transfer (DT) values for each attribute value (AV) of each attribute AT. This DT estimation is repeated for each scenario among the not-all-available scenarios. The DT values are estimated by comparing the predicted attribute value (AV) sales for the all-available scenarios with the predicted attribute value (AV) sales for the non-all-available scenarios predicted by the prediction model (216). Further, to determine average DT value for each AT, the method 300 allows the DT estimator 218 to average the plurality of DT values of each AV for corresponding AT.

Once the DT values are estimated, the method allows the hierarchy generator 222 to generate a hierarchy at attribute (AT) level based on the average DT value for each AT to identify the top node for the CDT. The top node corresponds to the attribute (AT) among the plurality of attributes (ATs) having lowest average DT value. Further, the method 300 includes allowing the scenario generator 220 to generate the not-all-available scenarios for the top node, wherein the not-all-available scenarios provide availability of only one AV of the top node at a single time instant. Further, the method 300 allows the CDT generator 224 to determine the average DT value for remaining ATs (other than the AT corresponding to the top node) for each available AV of the top node. Further, the method 300 includes identifying the sub node for each AV of the top node, wherein the sub node correspond to the AT having least average DT value.

The CDT generation is explained further with examples in FIG. 5a through FIG. 5h.

FIGS. 4a and 4b illustrates an example data matrix representing data aggregated from the data lake 106 as the multivariate multi-dependent structure for generating the prediction model 216 machine learning procedure, in accordance with some embodiments of the present disclosure. The data matrix is generated for the product category of interest (herein a mobile phone) by processing the data associated with the product category, which is managed by the entity for plurality of branches of the entity. The data matrix is split over the FIGS. 4a and 4b. The data matrix comprises sales driver data aggregated for the entity (E1) for a product category of interest (P1—mobile) from all its branches (herein, B1 to B3) at the predefined aggregation level. The sales drivers SD1 to SD5 representing store location, trade population, average income of population, inventory stock indicating availability (1) or unavailability (0) and inventory data with number of units present in stock and so on. Further the columns of the data matrix also include the recorded sales (sales units) for the product category, providing historical data. The number of sales drivers considered herein are representative and large number of sales drivers can be considered for more refined prediction model for higher prediction accuracy. The sales drivers to be added can be added as columns in the data matrix. The data aggregated can be for N number of aggregations levels (plurality of aggregation levels), herein AG1 to AG6, for all n branches (B1-Bn) of the entity (E1). For example, aggregation levels at which the sales drivers can be aggregated include, AG1— yearly, AG2—monthly per year, AG3—daily per month per year, AG4—hourly per day per month per year, AG5—every minute per hour per day per month per year, AG6—every second per minute per hour per day per month per year, AG7, AG8 and so on.

The recorded sales (actual units sold) for the product category provides the history of recorded sales for the product category for each branch at pre-defined aggregation level (for example herein, per hour level (AG4) for example herein). The product category sales are recorded for all permutations and combinations of sales driver data, typically permutation and combinations (available or unavailable) of attributes (ATs) and attribute values (AVs) for the product P1 in the inventory of the respective branch. The inventory corresponding to inventory availability and inventory stock, say for product P1 managed by entity E1 through a plurality of branches B1 to B3, each is characterized by a plurality of attributes (for example, color, memory size, brand). Each attribute further having plurality of attribute values (for example, color such as black (C1), white (C2), pink (C3), memory size as 2 GB (M1), 4 GB(M2), 6 GB (M3) and brand as Ph2 (Br1), Ph1 (Br2), Ph3 (Br3)). The rows of the data matrix include data at the predefined aggregation levels (her AG4) for all branches of the entity (E1B1 to E2B3).

Thus as seen, the data aggregated from the data lake 106 is represented in multivariate multi-dependent structure, wherein any number of rows and columns can be added to add additional sales drivers to be considered or additional braches monitored for longer time periods.

FIG. 5a through 5h explains the method for CDT generation with a use case example, in accordance with some embodiments of the present disclosure.

FIGS. 5a and 5b depicts sample scenarios with single missing AVs for each AT, at a given time instant. The scenarios are generated by the scenario generator 220 for the product category (mobile phone) with ATs as color, memory and brand. The AVs of color are black, white and pink. The AVs for memory are 2 Gega Bytes (GB), 4 GB and 16 GB, while the AVs for brand are Ph2, Ph1, Ph3. The same procedure can be repeated for scenarios with simultaneous multiple AVs missing, however, not considered here for simplicity of explanation.

FIG. 5c and FIG. 5d depict estimated DT values from the predicted AV sales of the mobile phone by the optimized prediction model 216 for all available scenario and one AV not available (one AV missing) scenario generated by the scenario generator 220. In the case of DT estimation from Black to other AVs, the scenario of FIG. 5c is passed to the prediction model 216 and the AV sales for the mobile phone are predicted. For example, DT from color Black (missing) to White and Pink is depicted in FIG. 5d. As depicted, even with Black missing, predicted sales of White have not increased, however predicted sales of Pink have increased by 2. Thus in case of unavailability of Black AV, DT from black to others is calculated. Herein, the DT from Black to White is 0% as sales of white have not increased even though Black was unavailable. While a non-zero DT value exists foe Black to Pink as Pink sales have gone up by 2 sales units (units sold). The computation of DT is provided by equation 1 below:

$$DT\% = (X-Y)/Z * 100 \quad (1)$$

For example herein, X=predicted sales units (units sold) of Pink when Black is missing.
Y=predicted sales units (units sold) of Pink when Black is present particularly all the attribute values (AVs) are present.
Z=predicted sales units (units sold) of Black when all the attribute values (AVs) are present.

Thus, as seen in FIG. 5d, (319−317)/11*100=18.18%, of the demand for Black has transferred to Pink and 0% to White. Similar scenarios, (not shown) with at least Black missing are passed to the prediction model 216 and respected AV sales are predicted.

Figures 5F, 5G:
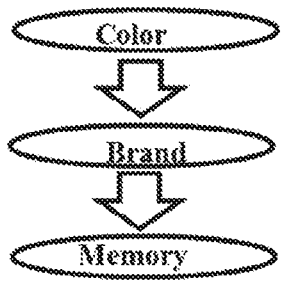
Figure 5H:
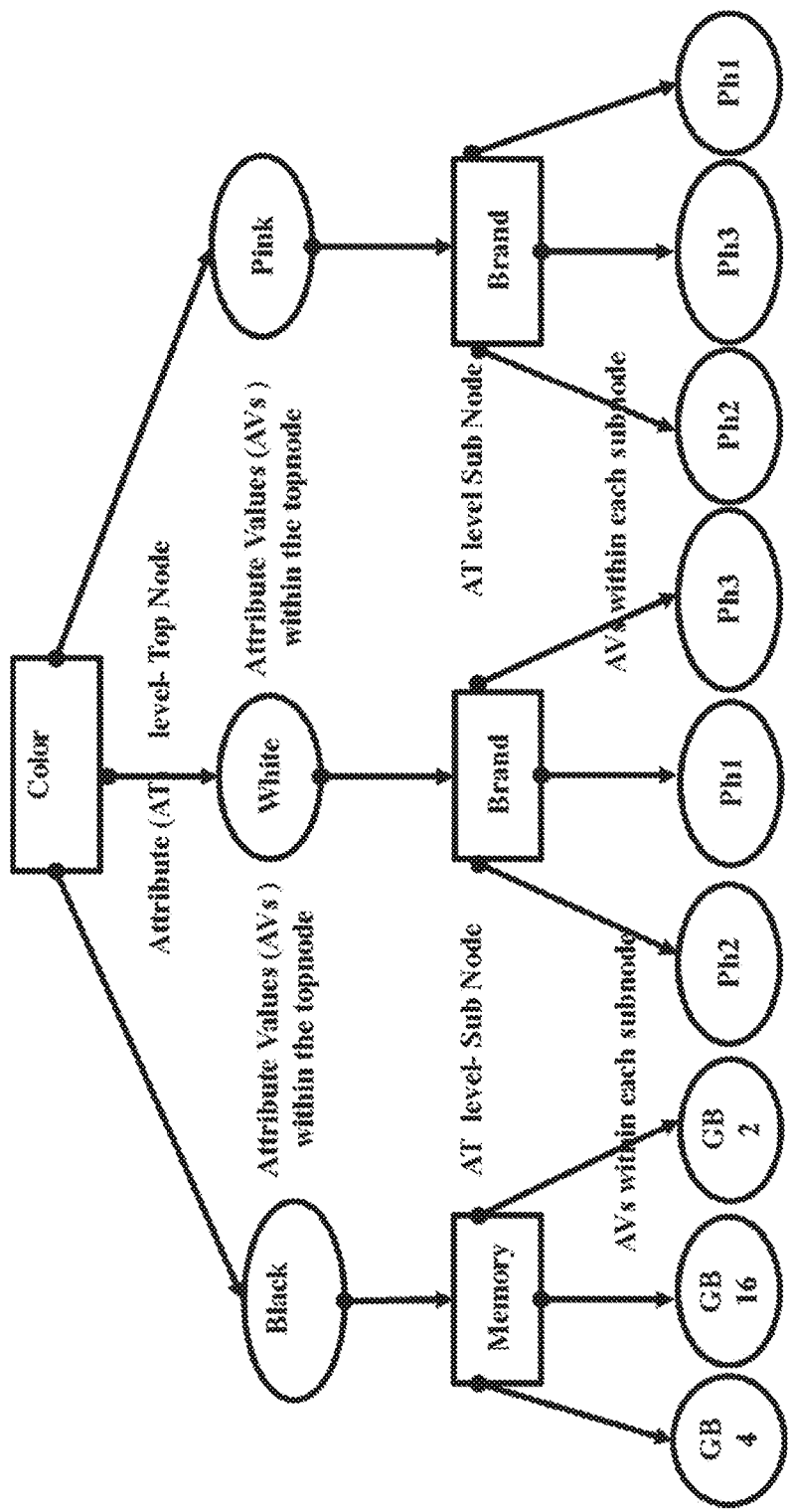

For DT estimation from scenarios with multiple attribute values (AVs) missing, difference between the predicted sales units is used to find out DT percentage as described in the previous step. Weighted average of DT percentage can provide the final DT for Black, where weights are derived from the sales performance of attribute values (AVs). In similar manner DT for White, Pink and all other attribute values (AVs) are derived and stored as depicted in FIG. 5e. Further, as depicted in FIG. 5f, the hierarchy generator 222 receives the DT at attribute value (AV) level and derives or predicts the DT value at Attribute value level by averaging out. It determines the top node by considering the magnitude of attribute (AT) level DT. In particular, the attribute (AT) with the lowest average DT is the most key attribute in customer mind that decides the purchase of the mobile. As in FIG. 5g, the top node is identified by the hierarchy generator 222 and passed into the CDT generator 224. The scenario generator 220 can get the required input from hierarchy generator 222 and can generate the required scenarios as in FIGS. 5a and 5b to create the CDT. The required scenarios can be passed into prediction model 216 and required DT is computed from the DT estimator 218 to generate the CDT as shown in FIG. 5h-. While generating the CDT, the top node and the sub nodes are dynamically generated and the scenario generator creates new scenarios as per changing outcomes of top node and/or sub node. This, ensure reduction of total scenarios that need to be generated to create CDT. The CDT in FIG. 5f indicates that color (AT) was identified as top node from ATs including the color, the memory and the brand. Then for each AVs (Black, White and Pink) of the top node, a non-available scenario was generated.

Then average DT value for remaining ATs (Brand and Memory) is calculated, wherein the sub node correspond to the AT having least average DT value. Thus for AV Black, of the top node color, the sub node as shown is memory as DT for memory was least. Similarly, for AV White and AV Pink, AT Brand is the sub node.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps of method 300 are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for generating a Customer Decision Tree (CDT) in accordance with an attribute value (AV) based Demand Transfer (DT) estimation for a product category, the method comprising:

aggregating (302), by one or more hardware processors, data associated with a plurality of AVs of the product category managed by an entity from a data lake directly connected to a CDT system, wherein data structure and requirements are not defined until the data is considered as required data by the CDT system, wherein aggregation of the data is at a plurality of aggregation levels and the product category is identified with a plurality of attributes (ATs) with each AT having the plurality of AVs (302), wherein the plurality of aggregation levels include aggregation of data per second, per minute, per hour, per day, per week and per month for the product category under consideration, wherein a predefined aggregation level is approximated from the plurality of aggregation levels based on rate of sales movement of an inventory stock for the entity, wherein the data lake is a data source providing data associated with the product category for all branches of the entity;

generating (304), by the one or more hardware processors, a data matrix to represent data in a format for machine learning as a multivariate multi-dependent structure from the data aggregated at the predefined aggregation level for the product category for the plurality of AVs, wherein a plurality of columns of the data matrix correspond to entity identity (ID) of the entity, the predefined aggregation level, sales drivers, and recorded AV sales, and wherein the sales drivers comprises demographic data associated with the product category, inventory availability of the AV and inventory stock of the AV, wherein the plurality of columns of the data matrix are incremented as required to dynamically accommodate the sales drivers that affect the sales of the product category and enables processing large volume of data corresponding to all sales drivers and recorded attribute value (AV) sales for the product category; and a plurality of rows of the data matrix correspond to the data aggregated for a plurality of branches of the entity for the predefined aggregation level;

generating (306), by the one or more hardware processors, a prediction model, using the data aggregated from the data lake as the multivariate multi-dependent structure and provided as an input data for machine learning process, to determine predicted AV sales for each of the AV of the product category at the predefined aggregation level, wherein the prediction model is a multivariate multi-structure machine learning model, wherein the recorded AV sales are represented in the matrix format that act as a multivariate dependent structure for the machine learning process to generate the prediction model, wherein the multivariate dependent structure captures interaction effects within dependent variables, and major sales drivers that includes inventory details of AVs providing the inventory availability of the AV and the inventory stock of the AV are represented in the matrix format that acts as multivariate independent structure for machine learning process, wherein the dependent structure and the independent structure captures interaction effect that exists in business scenario, wherein the recorded AV sales represent the dependent variables;

optimizing (308), by the one or more hardware processors, the prediction model to reduce error between the predicted AV sales and the recorded AV sales to minimum, wherein optimizing the prediction model comprises:

generating the data matrix for each aggregation level among the plurality of aggregation levels;

determining the predicted AV sales at each aggregation level using the prediction model;

determining error between the recorded AV sales and the predicted AV sales at each aggregation level;

identifying an optimum aggregation level from the plurality of aggregation levels based on the determined error, wherein the determined error for the identified aggregation level is minimum;

refining, by the one or more hardware processors, the prediction model with the identified optimum aggregation level that is a data aggregation level for which the predicted AV sales for all AVs for the product category as predicted by the prediction model provides minimum variation from the recorded AV sales, wherein an optimized prediction model is further used for prediction of AV sales; and generating (310), by the one or more hardware processors, the CDT utilizing the optimized prediction model, wherein the prediction model is refined with additional sales drivers and the CDT is generated for scenarios with sales patterns changing at a faster pace, wherein the optimum aggregation level reduces computation for generating the optimized prediction model and still maintain accuracy of AV sales prediction to generate more accurate CDT, wherein the machine learning process enhances scalability by handling high volume of aggregated data corresponding to sales drivers to generate the prediction model for predicting AV sales and increased number of sales drivers considered to improve accuracy of CDT as sales drivers have direct impact on AV sales, wherein the CDT is a graphical representation of customer's decision making process in form of a tree with a top node and a plurality of sub nodes, wherein the top node represents most important AT preferred by the customer and sub nodes represent a next important AT or AV for the customer, wherein the top node and the plurality of sub nodes are generated dynamically while generating the CDT and also creates new scenarios as per changing outcomes of at least one of the top node and the plurality of sub nodes resulting in reduction of total scenarios for generating CDT, wherein the CDT generation finds application in multiple domains where the decision is made based on multiple common criteria and each criteria includes multiple choice sets, wherein the domain includes a retail sector in which a group of mobile phones form the product category managed by a megastore and the plurality of attributes (ATs) associated with the mobile phone include brand, color, memory size, wherein the DT happens across varied combination of attributes that are influenced by customer lifestyle, demographics, seasonality and sales promotion, and sales drivers for all branches of the megastore across a city, a state, a country are considered, wherein the domain includes an insurance sector in which varied insurance policy options form the product category, wherein the domain include a banking sector and the CDT is generated for loan options provided by banks.

2. The method of claim 1, wherein generating the CDT utilizing the optimized prediction model comprises:

determining the predicted AV sales for a plurality of scenarios generated by a scenario generator using the optimized prediction model, wherein the plurality of scenarios comprises an all-available scenario and not-all-available scenarios corresponding to inventory availability of the AV of the product category, wherein the not-all-available scenarios correspond to inventory stock with one or more missing attributes among the plurality of attributes (ATs) and one or more missing attributes values (AVs) among the plurality of attribute values (AVs) of the product category;

estimating a plurality of DT values for each AV of each AT of the product category for each scenario among the not-all-available scenarios, wherein the estimation is performed by comparing the predicted AV sales for the all-available scenarios with the predicted AV sales for the non-all-available scenarios;

averaging the plurality of DT values of each AV for corresponding AT to determine average DT value for each AT;

generating a hierarchy at AT level based on the average DT value for each AT to identify a top node for the CDT, wherein the top node corresponds to the AT among the plurality of ATs, which provides lowest average DT value;

generating the not-all-available scenarios for the top node, wherein the not-all-available scenarios generated for the top node correspond to scenarios with availability of only one AV of the top node at a single time instant;

determining, for each available AV of the top node, the average DT value for remaining ATs other than the AT corresponding to the top node; and identifying a sub node for each AV of the top node, wherein the sub node corresponds to the AT having least average DT value.

3. A system (100) for generating a Customer Decision Tree (CDT) in accordance with an attribute value (AV) based Demand Transfer (DT) estimation for a product category, the system (100) comprising:

a data lake (106), as data source for aggregating data at a plurality of aggregation levels and provides data associated with the product category for all branches of an entity, wherein data structure and requirements are not defined until the data is considered as required data by the CDT system;

a CDT system (102), directly connected with the data lake (106) comprising one or more hardware processors (202) executing computer-readable instructions stored in a memory (204), the stored computer-readable instructions further comprising a data matrix generator (212), a model generator (214), a prediction model (216), a scenario generator (220), a DT Estimator (218), a hierarchy generator (222) and a CDT generator (224), wherein:

the data matrix generator (212) is configured to:

aggregate data associated with a plurality of AVs of the product category managed by the entity from the data lake, wherein aggregation of the data is at a plurality of aggregation levels and the product category is identified with a plurality of attributes (ATs) with each AT having the plurality of AVs, wherein the plurality of aggregation levels include aggregation of data per second, per minute, per hour, per day, per week and per month for the product category under consideration, wherein a predefined aggregation level is approximated from the plurality of aggregation levels based on rate of sales movement of an inventory stock for the entity;

generate a data matrix to represent data in a format for machine learning as a multivariate multi-dependent structure from the data aggregated at the predefined aggregation level for the product category for the plurality of AVs, wherein:

a plurality of columns of the data matrix correspond to entity identity (ID) of the entity, the predefined aggregation level, sales drivers and recorded AV sales, and wherein the sales drivers comprise demographic data associated with the product category, inventory availability of the AV and inventory stock of the AV, wherein the plurality of columns of the data matrix are incremented as required to dynamically accommodate the sales drivers that affect the sales of the product category and enables processing large volume of data corresponding to all sales drivers and recorded attribute value (AV) sales for the product category; and a plurality of rows of the data matrix correspond to the data aggregated for a plurality of branches of the entity for the predefined aggregation level;

the model generator (214) configured to:

generate the prediction model (216), using the data aggregated as the multivariate multi-dependent structure and provided as an input data for machine learning process, to determine predicted AV sales for each AV of the product category at the predefined aggregation level, wherein the prediction model is a multivariate multi-structure machine learning model, wherein the recorded AV sales are represented in the matrix format that act as a multivariate dependent structure for the machine learning process to generate the prediction model, wherein the multivariate dependent structure captures interaction effects within dependent variables, and major sales drivers that includes inventory details of AVs providing the inventory availability of the AV and the inventory stock of the AV are represented in the matrix format that acts as multivariate independent structure for machine learning process, wherein the dependent structure and the independent structure captures interaction effect that exists in business scenario, wherein the recorded AV sales represent the dependent variables; and optimize the prediction model (216) to reduce error between the predicted AV sales and the recorded AV sales to minimum, wherein the optimization comprises:
generate the data matrix for each aggregation level among the plurality of aggregation levels;
determine the predicted AV sales at each aggregation level using the prediction model;
determine error between the recorded AV sales and the predicted AV sales at each aggregation level;
identify an optimum aggregation level from the plurality of aggregation levels based on the determined error, wherein the determined error for the identified aggregation level is minimum;
refine the prediction model with the identified optimum aggregation level that is a data aggregation level for which the predicted AV sales for all AVs for the product category as predicted by the prediction model provides minimum variation from the recorded AV sales, wherein an optimized prediction model is further used for prediction of AV sales; and the CDT generator (224) configured to:
generate the CDT utilizing the optimized prediction model, wherein the prediction model is refined with additional sales drivers and the CDT is generated for scenarios with sales patterns changing at a faster pace,
wherein the optimum aggregation level reduces computation for generating the optimized prediction model and still maintain accuracy of AV sales prediction to generate more accurate CDT,
wherein the machine learning process enhances scalability by handling high volume of aggregated data corresponding to sales drivers to generate the prediction model for predicting AV sales and increased number of sales drivers considered to improve accuracy of CDT as sales drivers have direct impact on AV sales,
wherein the CDT is a graphical representation of customer's decision making process in form of a tree with a top node and a plurality of sub nodes, wherein the top node represents most important AT preferred by the customer and sub nodes represent a next important AT or AV for the customer, wherein the top node and the plurality of sub nodes are generated dynamically while generating the CDT and also creates new scenarios as per changing outcomes of at least one of the top node and the plurality of sub nodes resulting in reduction of total scenarios for generating CDT, wherein the CDT generation finds application in multiple domains where the decision is made based on multiple common criteria and each criteria includes multiple choice sets,
wherein the domain includes a retail sector in which a group of mobile phones form the product category managed by a megastore and the plurality of attributes (ATs) associated with the mobile phone include brand, color, memory size, wherein the DT happens across varied combination of attributes that are influenced by customer lifestyle, demographics, seasonality and sales promotion, and sales drivers for all branches of the megastore across a city, a state, a country are considered,
wherein the domain includes an insurance sector in which varied insurance policy options form the product category,
wherein the domain include a banking sector and the CDT is generated for loan options provided by banks.

4. The system (100) of claim 3, wherein the CDT generator (224) is configured to generate the CDT, wherein:
the scenario generator (220) is configured to:
generate a plurality of scenarios comprising an all-available scenario and not-all-available scenarios corresponding to inventory availability of the AV of the product category, wherein the not-all-available scenarios correspond to inventory stock with one or more missing attributes among the plurality of attributes (ATs) and one or more missing attributes values (AVs) among the plurality of attribute values (AVs) of the product category;
the prediction model (216) is configured to:
determine the predicted AV sales for the plurality scenarios;
the DT Estimator (218) is configured to:
estimate a plurality of DT values for each AV of each AT of the product category for each scenario among the not-all-available scenarios, wherein estimation is performed by comparing the predicted AV sales for the all-available scenarios with the predicted AV sales for the non-all-available scenarios predicted by the prediction model (216); and
average the plurality of DT values of each AV for corresponding AT to determine average DT value for each AT;
the hierarchy generator (222) is configured to:
generate a hierarchy at AT level based on the average DT value for each AT to identify a top node for the CDT, wherein the top node corresponds to the AT among the plurality of ATs, which provides lowest average DT value;
the scenario generator (220) is configured to:
generate the not-all-available scenarios for the top node, wherein the not-all-available scenarios generated for the top node correspond to scenarios with availability of only one AV of the top node at a single time instant; and
the CDT generator (224) is configured to:
determine the average DT value for remaining ATs other than the AT corresponding to the top node for each available AV of the top node; and identify a sub node for each AV of the top node, wherein the sub node corresponds to the AT having least average DT value.

5. One or more non-transitory machine readable information storage mediums comprising one or more instructions which when executed by one or more hardware processors cause:
aggregating data associated with a plurality of AVs of a product category managed by an entity from a data lake directly connected to a CDT system, wherein data structure and requirements are not defined until the data is considered as required data by the CDT system, wherein aggregation of the data is at a plurality of aggregation levels and the product category is identified with a plurality of attributes (ATs) with each AT having the plurality of AVs (302), wherein the plurality of aggregation levels include aggregation of data per second, per minute, per hour, per day, per week and per month for the product category under consideration, wherein a predefined aggregation level is approximated from the plurality of aggregation levels based on rate of sales movement of an inventory stock for the entity, wherein the data lake is a data source providing data associated with the product category for all branches of the entity;
generating a data matrix to represent data in a format for machine learning as a multivariate multi-dependent structure from the data aggregated at the predefined aggregation level for the product category for the plurality of AVs, wherein:
a plurality of columns of the data matrix correspond to entity identity (ID) of the entity, the predefined aggregation level, sales drivers, and recorded AV sales, and wherein the sales drivers comprises demographic data associated with the product category, inventory availability of the AV and inventory stock of the AV, wherein the plurality of columns of the data matrix are incremented as required to dynamically accommodate the sales drivers that affect the sales of the product category and enables processing large volume of data corresponding to all sales drivers and recorded attribute value (AV) sales for the product category; and
a plurality of rows of the data matrix correspond to the data aggregated for a plurality of branches of the entity for the predefined aggregation level;
generating a prediction model, using the data aggregated from the data lake as the multivariate multi-dependent structure and provided as an input data for machine learning process, to determine predicted AV sales for each of the AV of the product category at the predefined aggregation level, wherein the prediction model is a multivariate multi-structure machine learning model, wherein the recorded AV sales are represented in the matrix format that act as a multivariate dependent structure for the machine learning process to generate the prediction model, wherein the multivariate dependent structure captures interaction effects within dependent variables, and major sales drivers that includes inventory details of AVs providing the inventory availability of the AV and the inventory stock of the AV are represented in the matrix format that acts as multivariate independent structure for machine learning process, wherein the dependent structure and the independent structure captures interaction effect that exists in business scenario, wherein the recorded AV sales represent the dependent variables;
optimizing the prediction model to reduce error between the predicted AV sales and the recorded AV sales to minimum, wherein optimizing the prediction model comprises:
generating the data matrix for each aggregation level among the plurality of aggregation levels;
determining the predicted AV sales at each aggregation level using the prediction model;
determining error between the recorded AV sales and the predicted AV sales at each aggregation level;
identifying an optimum aggregation level from the plurality of aggregation levels based on the determined error, wherein the determined error for the identified aggregation level is minimum;
refining the prediction model with the identified optimum aggregation level that is a data aggregation level for which the predicted AV sales for all AVs for the product category as predicted by the prediction model provides minimum variation from the recorded AV sales, wherein an optimized prediction model is further used for prediction of AV sales; and
generating the CDT utilizing the optimized prediction model, wherein the prediction model is refined with additional sales drivers and the CDT is generated for scenarios with sales patterns changing at a faster pace, wherein the optimum aggregation level reduces computation for generating the optimized prediction model and still maintain accuracy of AV sales prediction to generate more accurate CDT,
wherein the machine learning process enhances scalability by handling high volume of aggregated data corresponding to sales drivers to generate the prediction model for predicting AV sales and increased number of sales drivers considered to improve accuracy of CDT as sales drivers have direct impact on AV sales,
wherein the CDT is a graphical representation of customer's decision making process in form of a tree with a top node and a plurality of sub nodes, wherein the top node represents most important AT preferred by the customer and sub nodes represent a next important AT or AV for the customer, wherein the top node and the plurality of sub nodes are generated dynamically while generating the CDT and also creates new scenarios as per changing outcomes of at least one of the top node and the plurality of sub nodes resulting in reduction of total scenarios for generating CDT, wherein the CDT generation finds application in multiple domains where the decision is made based on multiple common criteria and each criteria includes multiple choice sets,
wherein the domain includes a retail sector in which a group of mobile phones form the product category managed by a megastore and the plurality of attributes (ATs) associated with the mobile phone include brand, color, memory size, wherein the DT happens across varied combination of attributes that are influenced by customer lifestyle, demographics, seasonality and sales promotion, and sales drivers for all branches of the megastore across a city, a state, a country are considered,
wherein the domain includes an insurance sector in which varied insurance policy options form the product category,
wherein the domain include a banking sector and the CDT is generated for loan options provided by banks.

6. The one or more non-transitory machine readable information storage mediums of claim 5, wherein generating the CDT utilizing the optimized prediction model comprises:

determining the predicted AV sales for a plurality scenarios generated by a scenario generator using the optimized prediction model, wherein the plurality of scenarios comprises an all-available scenario and not-all-available scenarios corresponding to inventory availability of the AV of the product category, wherein the not-all-available scenarios correspond to inventory stock with one or more missing attributes among the plurality of attributes (ATs) and one or more missing attributes values (AVs) among the plurality of attribute values (AVs) of the product category;

estimating a plurality of DT values for each AV of each AT of the product category for each scenario among the not-all-available scenarios, wherein estimation is performed by comparing the predicted AV sales for the all-available scenarios with the predicted AV sales for the non-all-available scenarios;

averaging the plurality of DT values of each AV for corresponding AT to determine average DT value for each AT;

generating a hierarchy at AT level based on the average DT value for each AT to identify a top node for the CDT, wherein the top node corresponds to the AT among the plurality of ATs, which provides lowest average DT value;

generating the not-all-available scenarios for the top node, wherein the not-all-available scenarios generated for the top node correspond to scenarios with availability of only one AV of the top node at a single time instant;

determining, for each available AV of the top node, the average DT value for remaining ATs other than the AT corresponding to the top node; and identifying a sub node for each AV of the top node, wherein the sub node corresponds to the AT having least average DT value.

* * * * *